United States Patent [19]
Min

[11] Patent Number: 5,343,982
[45] Date of Patent: Sep. 6, 1994

[54] GREASE PUMP

[76] Inventor: Mao C. Min, P.O. Box 82-144, Taipei, Taiwan

[21] Appl. No.: 981,297

[22] Filed: Jan. 26, 1993

[51] Int. Cl.$^5$ .............................................. F16N 3/12
[52] U.S. Cl. ..................... 184/28; 184/45.2; 184/105.2; 417/555.1; 222/256
[58] Field of Search ...................... 184/27.1, 28, 105.2, 184/37, 38.1, 45.1, 45.2; 222/256, 326; 417/545, 555.1

[56] References Cited

U.S. PATENT DOCUMENTS

| | | | |
|---|---|---|---|
| 1,494,652 | 1/1922 | Wallace | 184/105.2 |
| 1,703,278 | 2/1929 | Claud-Mantle | 184/105.2 |
| 1,884,750 | 10/1932 | Koppelman et al. | 417/555.1 |
| 2,539,846 | 1/1951 | Lewis et al. | 417/555.1 |
| 2,574,744 | 11/1951 | Koepke | 184/28 |

FOREIGN PATENT DOCUMENTS

| | | | |
|---|---|---|---|
| 0161474 | 11/1952 | Australia | 184/105.2 |
| 0527346 | 7/1956 | Canada | 184/105.2 |
| 3137164 | 4/1983 | Fed. Rep. of Germany | 184/105.2 |
| 0164274 | 8/1958 | Sweden | 184/28 |

*Primary Examiner*—Thomas E. Denion
*Attorney, Agent, or Firm*—Alfred Lei

[57] ABSTRACT

This invention relates to a grease pump and in particular to one including a body portion having a main tube and a cover threadedly engaged with an end of the main tube, an adjusting device mounted with the main tube and having a throttle valve, a steel ball, a seat, a first piston, and a first Venturi tube, a resilient member disposed within the first Venturi tube, a pumping device including a second Venturi tube, a sleeve, a second piston, two oil seals, a head, a packing and a nozzle, a sealing ring mounted between the nozzle and the head, whereby the grease pump may be operated with a single hand and is especially useful in a narrow space.

1 Claim, 9 Drawing Sheets

GREASE PUMP

BACKGROUND OF THE INVENTION

Figure 1:
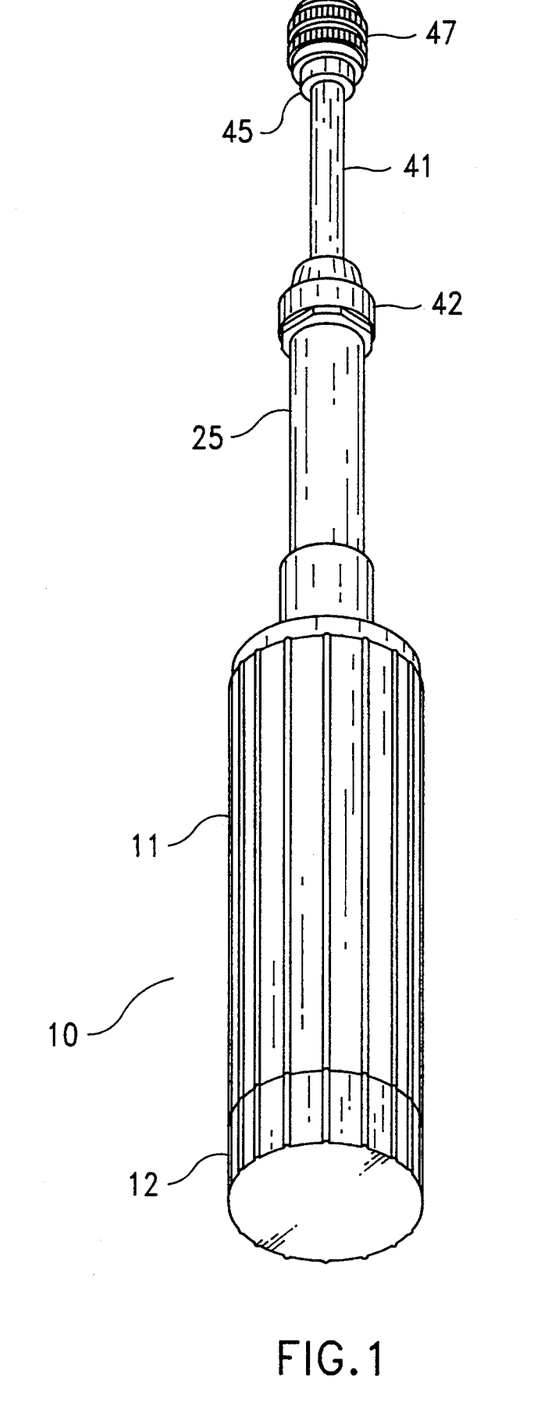
FIG. 1 is a perspective view of the present invention.
Figure 2:
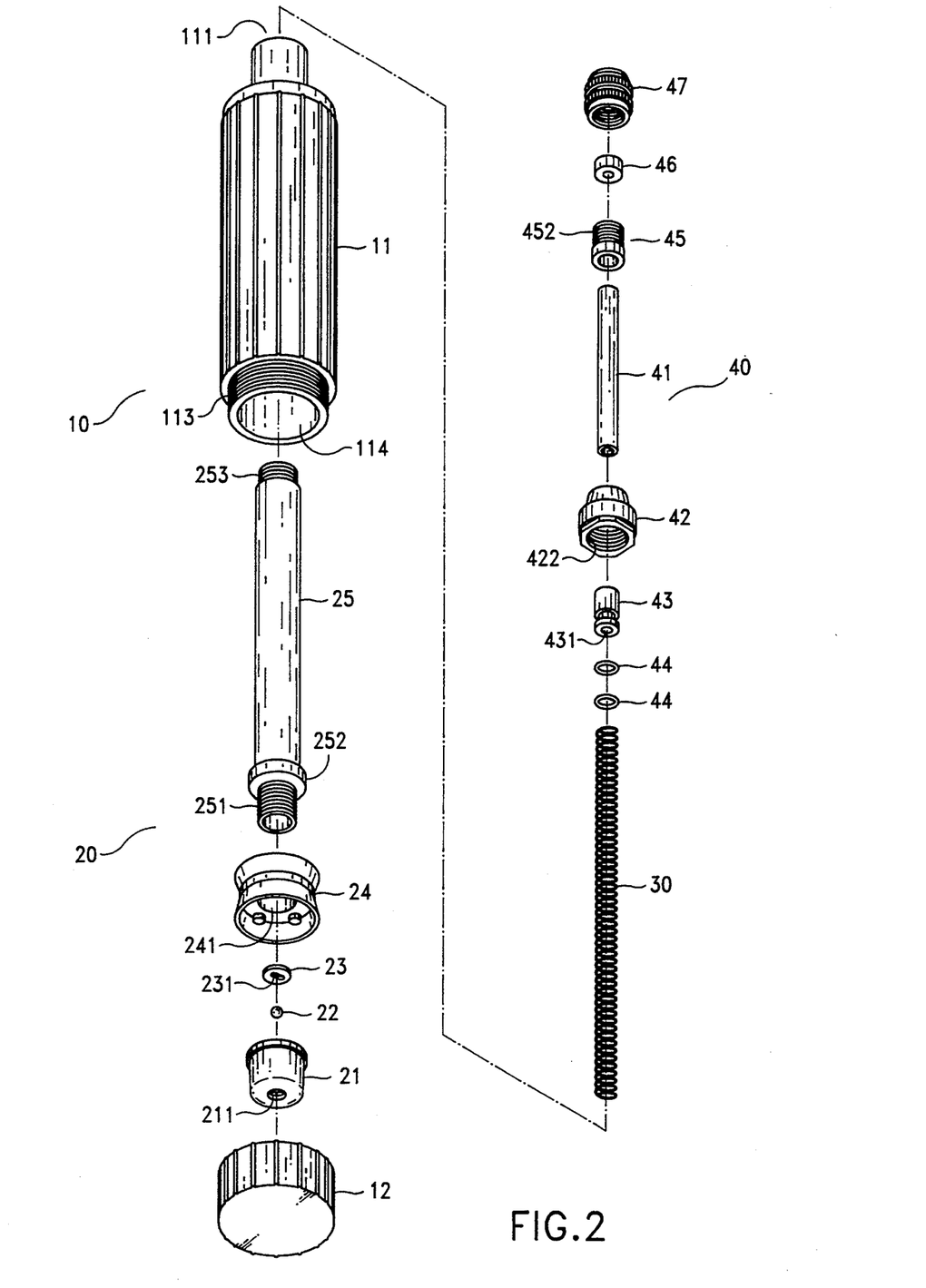
FIG. 2 is an exploded view of the present invention.
Figure 3:
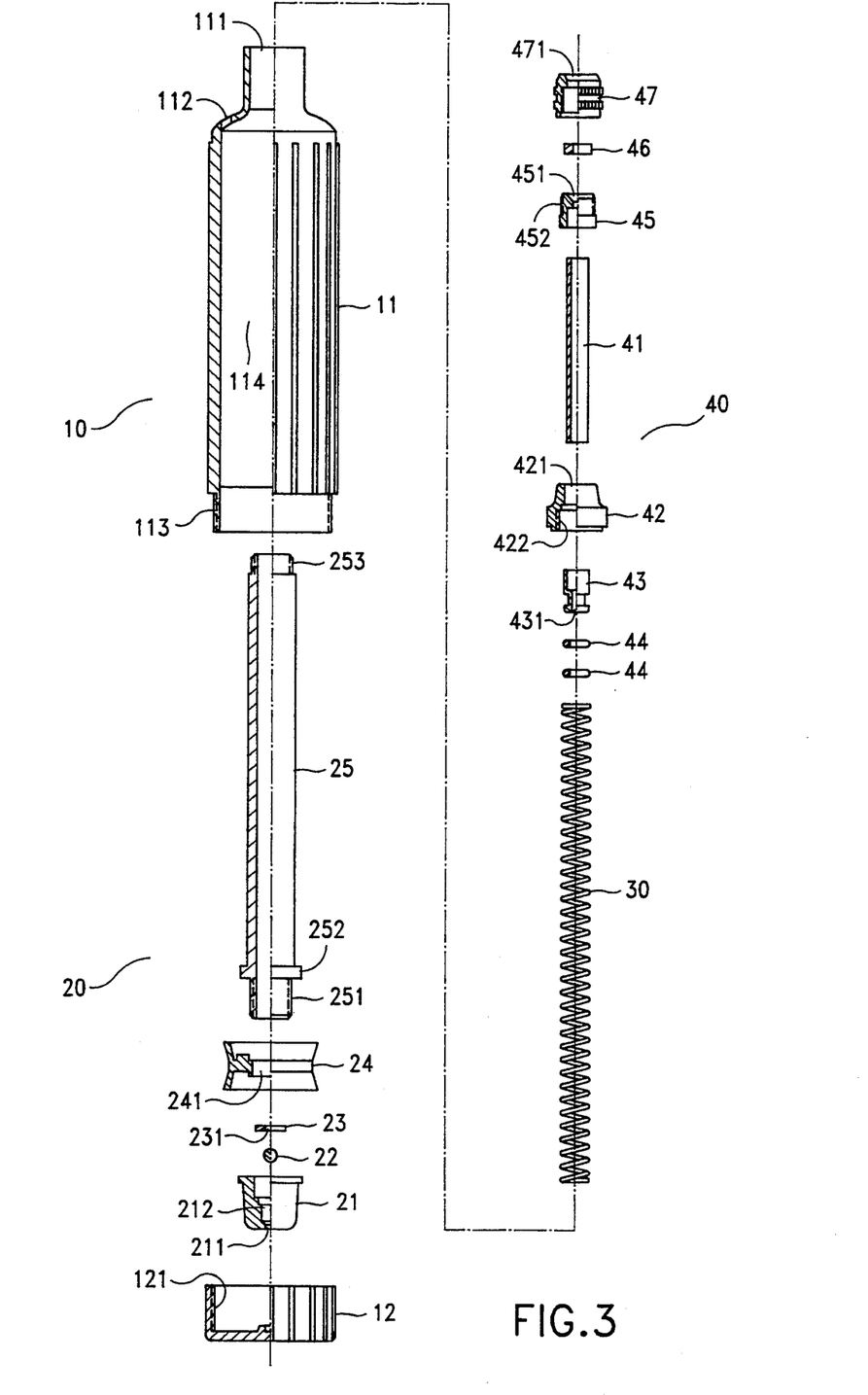
FIG. 3 is a sectional view showing the structure of the present invention.
Figure 4:
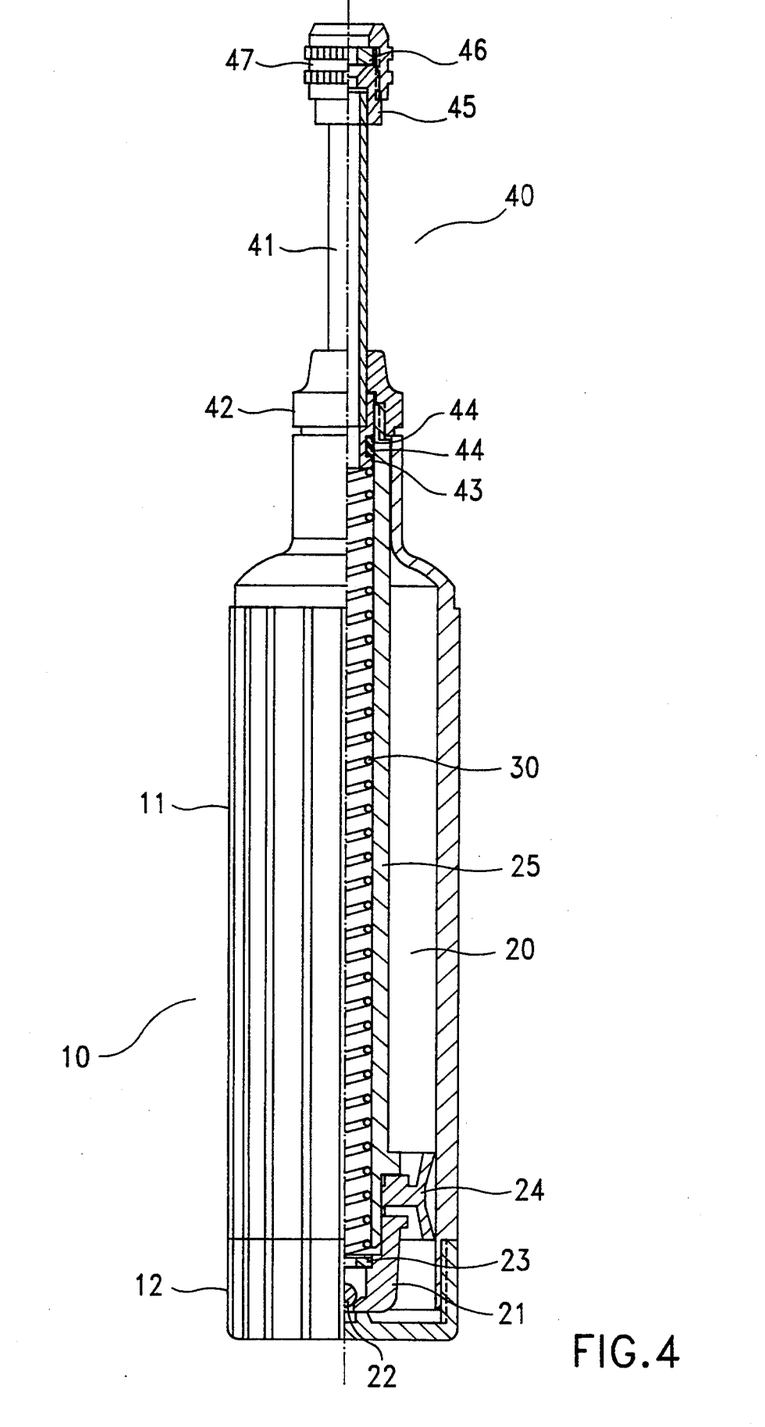
FIG. 4 is a sectional view of the present invention.
Figure 5:
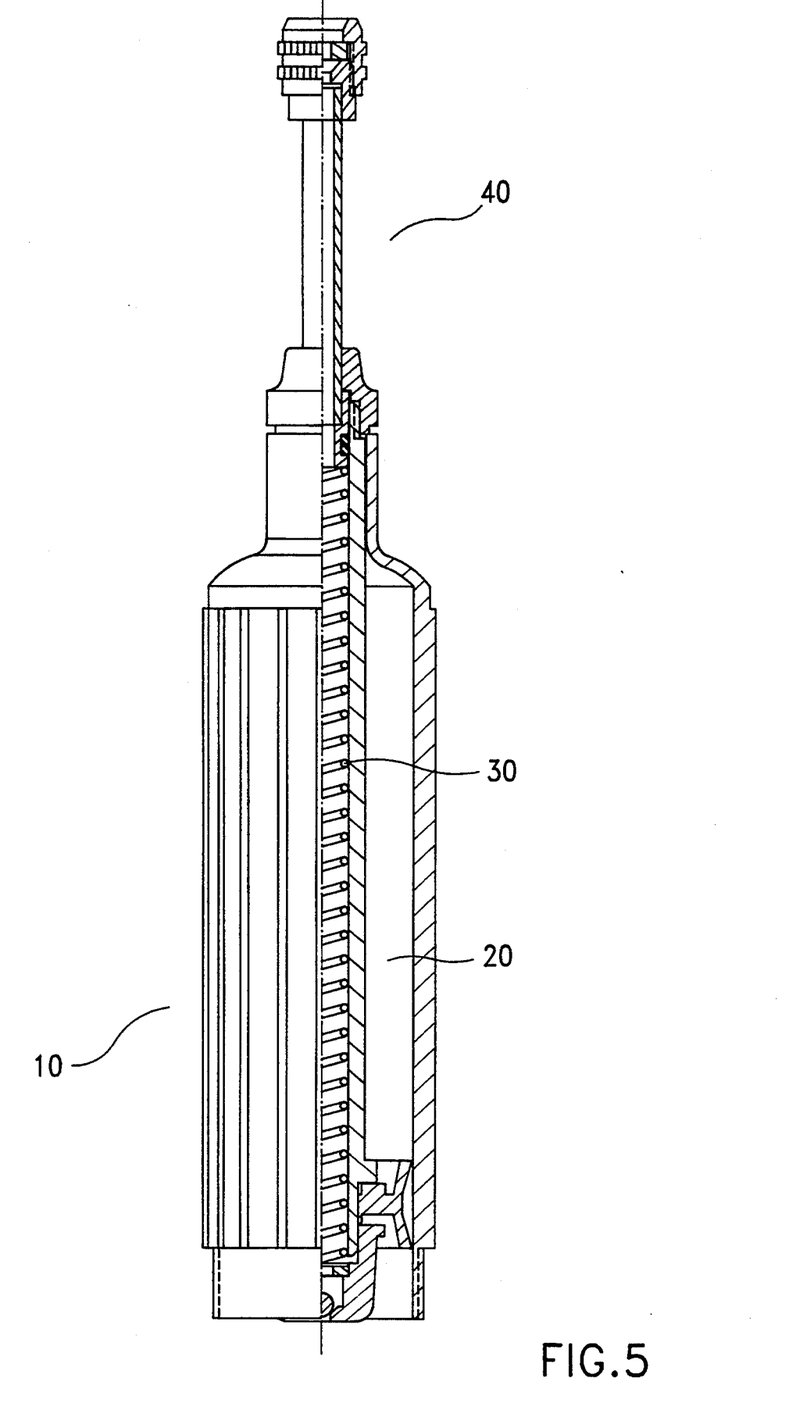
FIGS. 5, 6, 7 and 8 show the working principle of the present invention.
Figure 6:
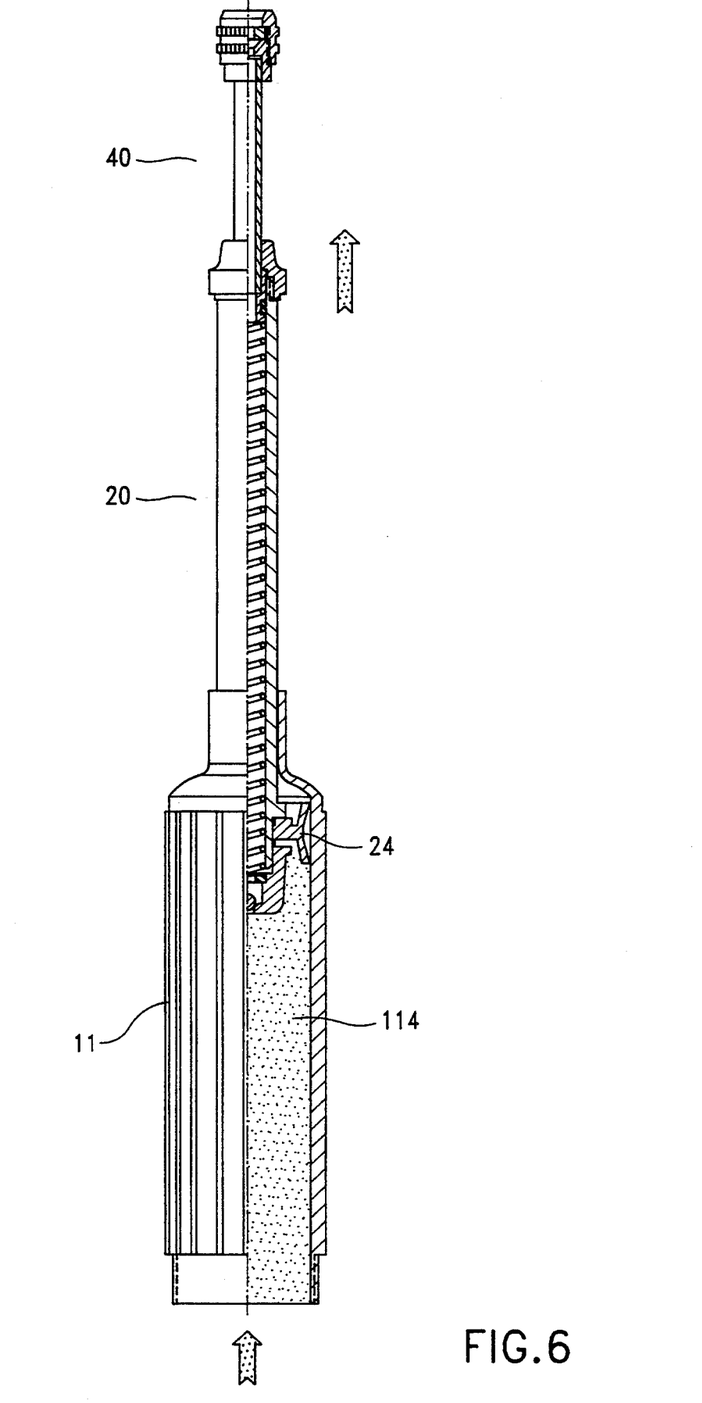
Figure 7:
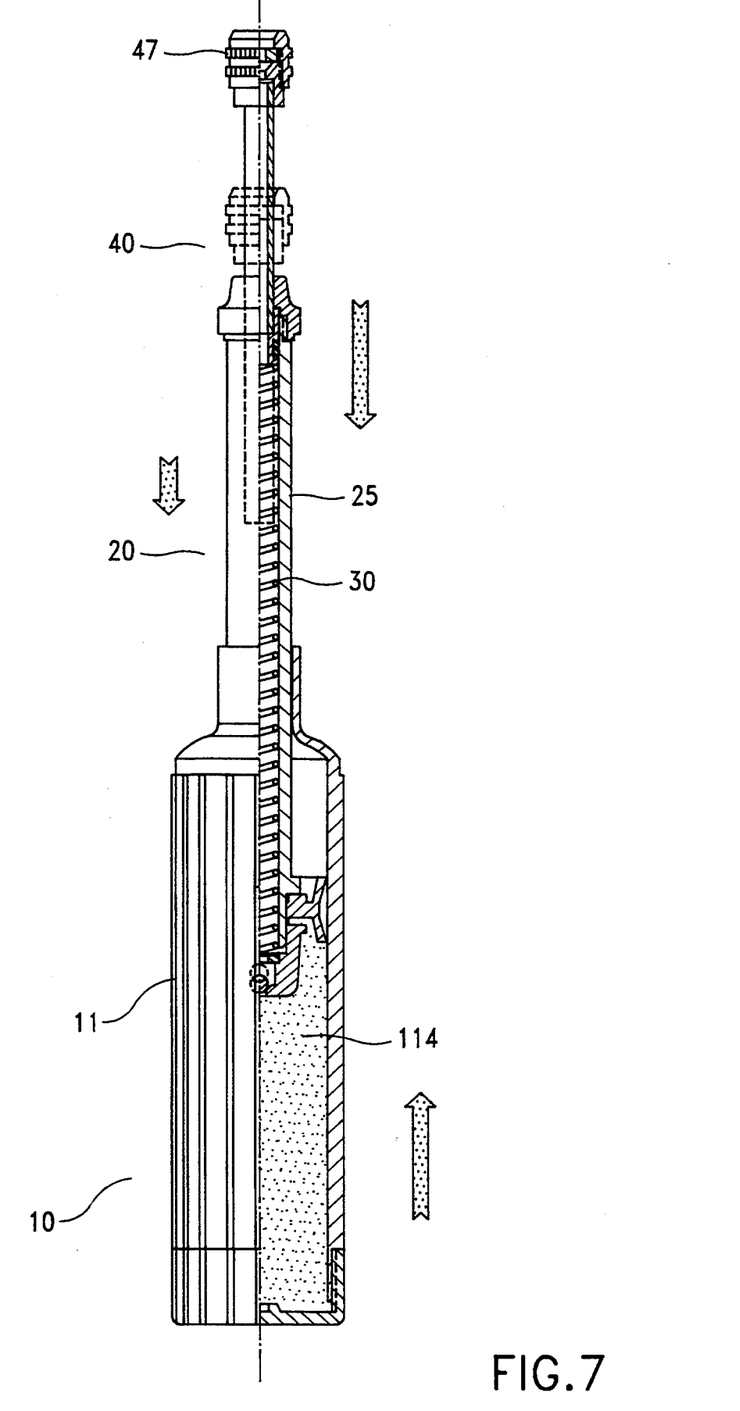
Figure 8:
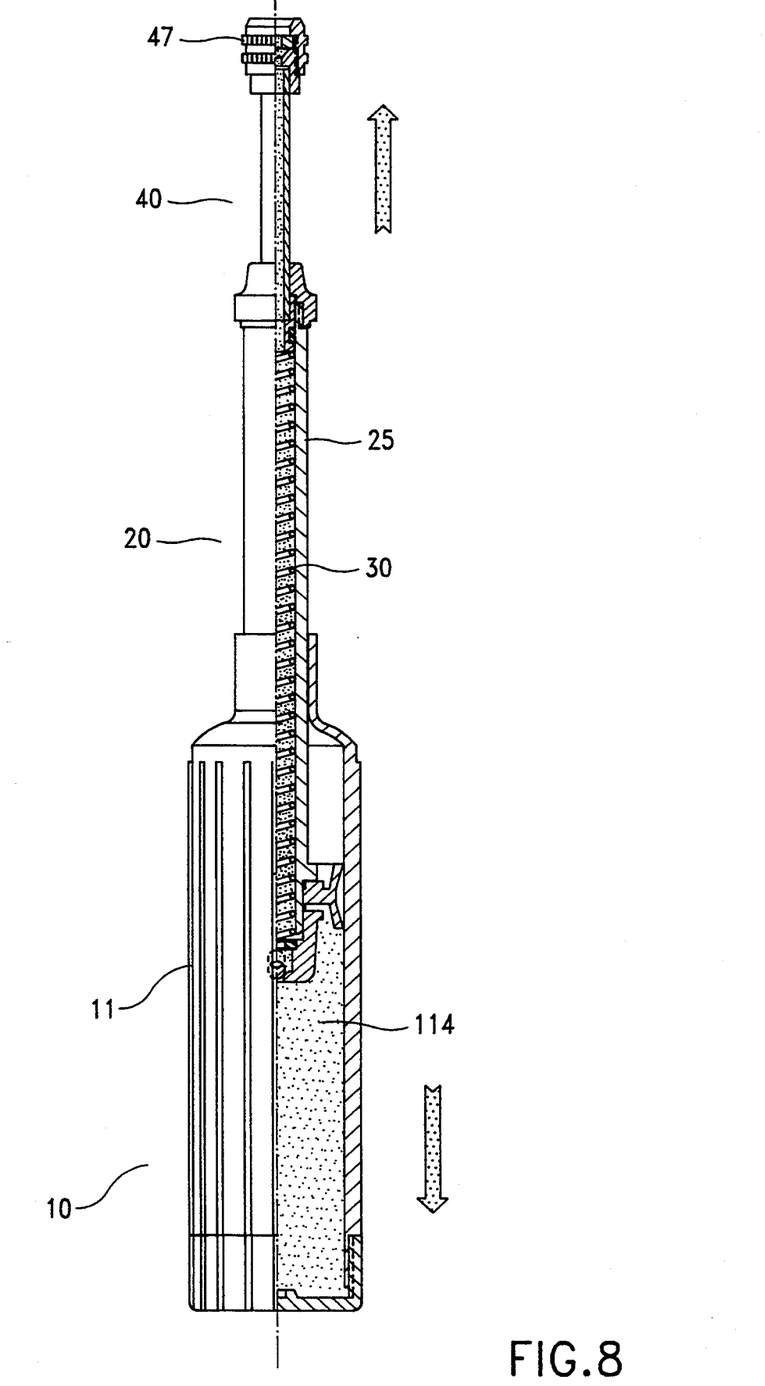
Figure 9:
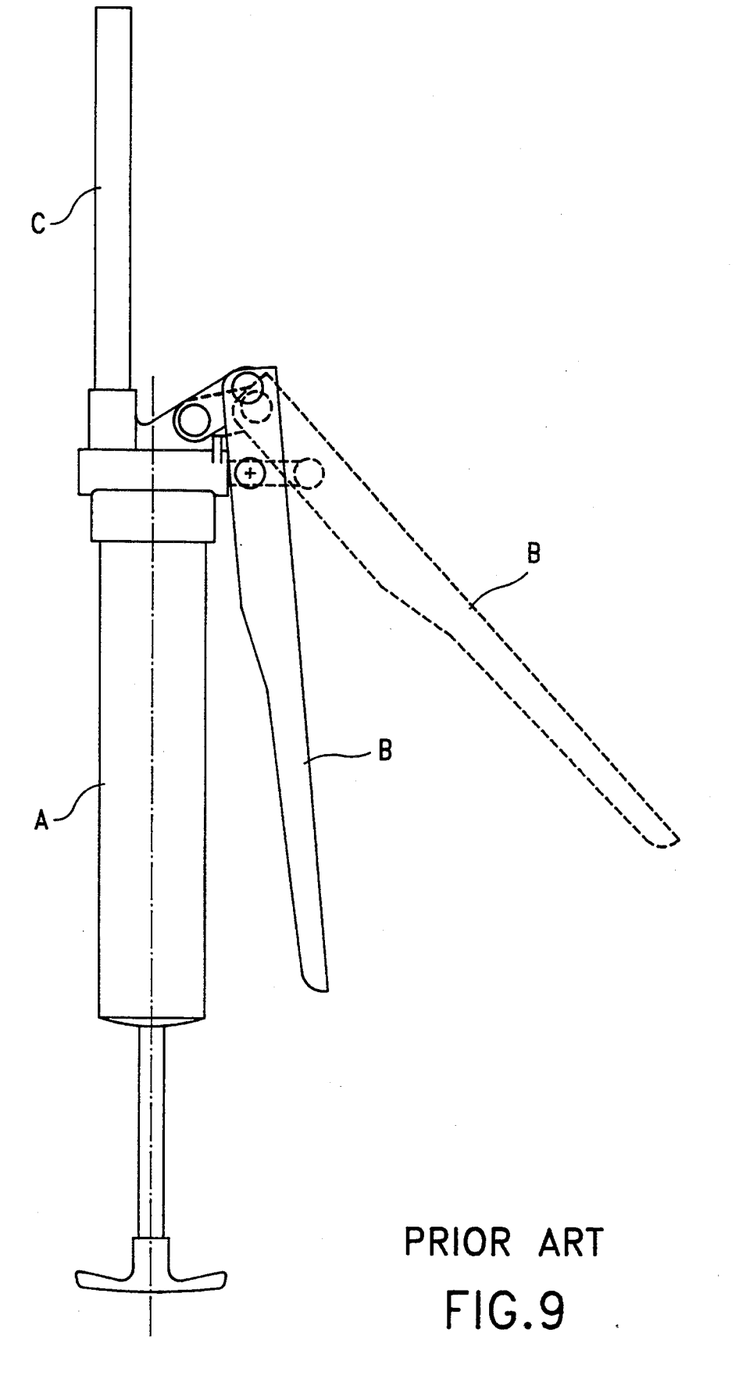
FIG. 9 is a perspective view of a prior art grease pump.

With reference to FIG. 9, there is shown a prior art grease pump. As illustrated, the grease pump is operated by moving the handle B up and down so as to squeeze the grease out of the outlet C into the inlet of a machine. However, it is necessary to oscillate the handle B with one hand and hold the body portion A with the other. Hence, such grease pump is only suitable for use a large space and will become very difficult to be operated in a narrow space.

Therefore, it is an object of the present invention to provide an improved grease pump which may obviate and mitigate the above-mentioned drawbacks.

SUMMARY OF THE INVENTION

This invention relates to an improved grease pump. It is the primary object of the present invention to provide a grease pump which may be operated with a single hand.

It is another object of the present invention to provide a grease pump which may be used in a narrow space.

It is still another object of the present invention to provide a grease pump which is convenient to carry.

It is still another object of the present invention to provide a grease pump which is simple in construction.

It is a further object of the present invention to provide a grease pump which is practical in use.

Other objects and merits and a fuller understanding to the present invention will be obtained by those having ordinary skill in the art when the following detailed description of the preferred embodiment is read in conjunction with the accompanying drawings.

DETAILED DESCRIPTION OF THE PREFERRED EMBODIMENT

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 1 through 4, the grease pump according to the present invention mainly comprises a body portion 10, an adjusting device 20, a resilient member 30, and a pumping device 40.

The body portion 10 is a tubular member having a main tube 11 and a cover 12 and is designed to receive the adjusting device 20 and an appropriate amount of grease.

The main tube 11 is also a tubular member which is formed with a neck portion 111 on the top end, a ventilation hole 112 on the shoulder, and a threaded portion 113 on the bottom end.

The cover 12 is provided with internal threads engageable with the threaded portion 113 of the main tube 11.

The adjusting device 20 is provided with a throttle valve 21, a steel ball 22, a seat 23, a first piston 24, and a first Venturi tube 25 and slidably mounted within the main tube 11 so that the adjusting device 20 not only can draw the grease to the grease chamber 114 of the main tube 11 but also control the grease to flow into the pumping device 40.

The throttle valve 21 has a smaller hole 211 and a larger hole 212 which are associated with the steel ball 22 and the seat 23 to form a check valve. Further, the throttle valve 21 is connected with the threaded end 251 of the first Venturi tube 25.

The seat 23 is a circular member formed with an elongated slot 231 and fitted into the larger hole 212 of the throttle valve 21.

The first piston valve 24 is just fitted into the grease chamber 114 of the main tube 11 and has a center hole 241 and kept in position by the engagement between the throttle valve 21 and the threaded end 251 of the first Venturi tube 25.

The first Venturi tube 25 is a tubular member and has a threaded portion 251 at the lower end, a flange 252 above the threaded portion 251, and a threaded portion 253 at the upper end. The threaded portion 253 at the upper end of the first Venturi tube 25 is engaged with a sleeve 42 of the pumping device 40.

The resilient member 30 is slightly longer than the Venturi tube 25 and disposed within the first Venturi tube 25 with its one end bearing against the seat 23 and its the other end against the pumping device 40.

The pumping device 40 includes a second Venturi tube 41, a sleeve 42, a second piston 43, two oil seals 44, a head 45, a packing 46 and a nozzle 47. The sleeve 42 is engaged with the threaded portion 253 of the first Venturi tube 25 so that the grease 41 will be squeezed out of the first Venturi tube 25 when the pumping device 40 is compressed and the grease will be sucked into the first Venturi tube 25 from the grease chamber 114 of the main tube 11.

The second Venturi tube 41 is also a tubular member for storing an appropriate amount of grease.

The sleeve 42 is formed with a through hole 421 and internal threads 422 and put onto the second Venturi tube 41.

The second piston 43 is formed with a passage 431 and rivetted on the tail end of the second Venturi tube 41. Further, the second piston 43 is engaged with two oil seals 44 and fitted into the first Venturi tube 25 so as to prevent the grease from going into the first Venturi tube 25 from the grease chamber 114 of the main tube 11 thereby preventing grease leaking.

The head 45 is provided with an orifice 451 and external threads 452 and rivetted on the top end of the second Venturi tube 41.

A sealing ring 46 is made of resilient material and mounted between the nozzle 47 and the head 45.

The nozzle 47 has a conical opening 471 and threadedly engaged with the external threads 452 of the head 45.

When in use, first open the cover 12 and hold the main tube 11 with one hand. Then, insert the main tube 11 into a grease container (not shown) and use the other hand to pull the pumping device 40 gradually out of the adjusting device 20. In the meantime, the first piston 24 will suck the grease into the grease chamber 114 of the main tube 11. Thereafter, engage the cover 12 with the main tube 11. Then, hold the rear portion of the body portion 10 with one hand and align the nozzle 47 with the grease inlet of a machine (not shown). Afterwards, push the body portion 10 forwards with the same hand so that the pumping device 40 pushes against the resilient member 30. Meanwhile the adjusting device 20 will go backwards to compress the grease in the grease chamber 114 of the main tube 11. Then, the pumping device 40 will be retracted to compress the grease out into the grease inlet of the machine. As the body portion 10 is released, the resilient member 30 will push the pumping device 40 outward thereby sucking the grease in the grease chamber 114 of the main tube 11 into the first Venturi tube 25. As such, the grease squeezed out of the present invention may be controlled as required.

The application of the present invention is too wide to be mentioned and cannot be all enumerated here in detail. It is understood that the present disclosure is made by way of example only and that numerous changes int the detail of construction and the combination of parts may be resorted to without departing from the spirit and scope of the invention as hereinafter claimed.

I claim:
1. A grease pump comprising:
   a body portion including a main tube and a cover threadedly engaged with a bottom end of said main tube, said main tube being formed with a neck portion on a top end, a ventilation hole on a shoulder and a threaded portion on the bottom end;
   an adjusting device slidably mounted within said main tube and having a throttle valve, a steel ball, a seat, a first piston, and a first Venturi tube, said throttle valve being threadedly engaged with an end of said first Venture tube and having a smaller hole and a larger hole which are communicated and aligned with each other and associated with said steel ball and said seat to form a check valve, said seat being a circular member formed with an elongated slot and fitted into the larger hole of said throttle valve, said first piston being fitted into a chamber of said main tube and having a center hole;
   a resilient member disposed within said first Venturi tube;
   a pumping device including a second Venturi tube, a sleeve, a second piston, two oil seals, a head, a packing, and a nozzle, said sleeve being engaged with said first Venturi tube and formed with a through hole and internal threads and put onto said second Venturi tube, said second piston having a passage and rivetted on said second Venturi tube and engaged with said two oil seals and fitted into said first Venturi tube, said head being provided with an orifice and external threads and rivetted on a top end of said second Venture tube; and
   a sealing ring mounted between said nozzle and said head, said nozzle having a conical opening and threadedly engaged with said head.

* * * * *